United States Patent
Brockmann et al.

(10) Patent No.: US 6,789,186 B1
(45) Date of Patent: Sep. 7, 2004

(54) METHOD AND APPARATUS TO REDUCE PENALTY OF MICROCODE LOOKUP

(75) Inventors: Russell C. Brockmann, Fort Collins, CO (US); Kevin David Safford, Fort Collins, CO (US); Jane Wang, Fort Collins, CO (US); Chris Poirier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,038

(22) Filed: Feb. 18, 2000

(51) Int. Cl.$^7$ ............................................. G06G 9/00
(52) U.S. Cl. ................................. 712/231; 712/211
(58) Field of Search ............................. 712/231, 211, 712/240, 227, 208, 209

(56) References Cited

U.S. PATENT DOCUMENTS

| | | | |
|---|---|---|---|
| 3,736,567 A | * 5/1973 | Lotan et al. ............... | 712/231 |
| 4,107,774 A | * 8/1978 | Joyce et al. ............... | 712/231 |
| 4,376,976 A | * 3/1983 | Lahti et al. ............... | 712/248 |
| 5,299,318 A | * 3/1994 | Bernard et al. ............ | 712/231 |
| 5,826,089 A | * 10/1998 | Ireton ....................... | 717/146 |
| 5,859,999 A | 1/1999 | Morris et al. .............. | 095/565 |
| 5,860,017 A | 1/1999 | Sharangpani et al. ..... | 395/800.23 |
| 5,933,629 A | * 8/1999 | Mahalingaiah et al. .... | 712/248 |

OTHER PUBLICATIONS

Wolfe, A., "Patents shed light on Merced's Innards", Electronic Engineering Times, Feb. 15, 1999.

* cited by examiner

*Primary Examiner*—Eddie Chan
*Assistant Examiner*—Charles Harkness

(57) ABSTRACT

A method and apparatus are provided for improving the rate at which macroinstructions are transformed into corresponding microinstructions. Encoding is added to a microcode storage device. The encoding indicates that a microinstruction flow will end in a determined number of cycles. The number of cycles is determined by the number of canceled instructions in a processing pipeline that would be introduced if no flow length prediction was used. For flow lengths less than a determined number of cycles, a hint bit is used in an entry point structure. For flow lengths greater than a determined length, a hint bit is encoded at a third line from an end of the microinstruction flow. Using this method, flows of any length can be hinted. Furthermore, flows that do not originate from the entry point structure can also be hinted. The method reduces the number of hint bits that are needed in the entry point structure and provides for better prediction.

19 Claims, 3 Drawing Sheets

| | $62_1$ | $62_2$ | | $62_n$ | Flow Hint $63$ |
|---|---|---|---|---|---|
| $61_1$ Microcode Line 1 | Micro-instruction 1 | Micro-instruction 2 | ... | Micro-instruction n | No |
| $61_2$ Microcode Line 2 | Micro-instruction 1 | Micro-instruction 2 | | Micro-instruction n | No |
| ⋮ | | | ⋮ | | ⋮ |
| $61_{N-3}$ Microcode Line N-3 | Micro-instruction 1 | Micro-instruction 2 | | Micro-instruction n | No |
| $61_{N-2}$ Microcode Line N-2 | Micro-instruction 1 | Micro-instruction 2 | | Micro-instruction n | Hint at N-2 |
| $61_{N-1}$ Microcode Line N-1 | Micro-instruction 1 | Micro-instruction 2 | | Micro-instruction n | No |
| $61_N$ Microcode Line N | Micro-instruction 1 | Micro-instruction 2 | | Micro-instruction n | No |

*Fig. 2*

METHOD AND APPARATUS TO REDUCE PENALTY OF MICROCODE LOOKUP

TECHNICAL FIELD

The technical field is a computer system implementing an instruction set architecture using microcoded instructions.

BACKGROUND

Microcoded computer systems may implement a single instruction set architecture (ISA) for a first and a second computer architecture. For example, a second ISA may be implemented by emulating the second ISA with instructions native to the first ISA. The instructions from the second architecture are often called macroinstructions and instructions from the first architecture are often called microinstructions.

In other cases, a computer system may implement a single ISA even though there is a separate, often hidden, ISA that is used to implement the visible ISA. For example, many current x86 computer processors are microcoded. Users only see the x86ISA. The processors implement the ISA using an "invisible" ISA that is not known to the users.

Conversion from a macroinstruction to a microinstruction may be accomplished by using one or more large read-only memory (ROM) structures containing the microinstructions needed to emulate the original macroinstruction. Conversion may also be implemented using a random access memory (RAM), a programmable logic array (PLA) and other devices. Expansion of a macroinstruction into one or more microinstructions can be controlled by an instruction sequencer. The set of microinstructions needed to emulate a macroinstruction is called a flow. An entry point into the ROM is typically determined by a large PLA that maps instruction op codes and operand fields to a specific location in the ROM. Once the entrypoint determination logic has provided an entry point or initial address, the instruction sequencer takes over and controls the microcode flow, fetching additional entries from the ROM in a sequential fashion, or, if a microbranch is encountered, branching to the microbranch target. Providing microbranches in the ROM to redirect flow of the microinstructions helps to improve code reuse of the ROM.

Despite efforts to minimize the size of the ROM, multiple processing pipeline stages are often required to read the ROM and obtain the microinstructions. These stages may include decoding of the address into row, column and block selects, driving the selects to the ROM array, driving the selected data out of the ROM array, decoding the microinstruction, and determining if the end of the flow has been reached.

If a redirection or branch is needed, several cycles worth of instructions that have already been read into the pipeline may need to be invalidated, slowing the computing process. One common technique to mitigate this performance degradation is to allow for delayed branches, so that the cycles after the branch can still be used for productive work. However, this technique does not work when the boundary of a macroinstruction is reached. Finishing one flow and starting with another flow appears to the processor to be very much like a branch, except that the branch target is not available as part of the earlier flow.

The common method to overcome this problem involves hinting flows in the same structure that calculates flow entry points, referred to herein as an entry point PLA, although the method can be implemented with other structures that are well known in the art. This hint is used to predict when the next flow should enter the sequencer, avoiding the pipeline delays that would otherwise be required. For instance, a flow that requires only one line of microcode could have a hint of one. When the instruction sequencer sees that the current flow is only one line long, the instruction sequencer advances the next flow into the instruction sequencer in the next cycle without having to decode the instruction.

A difficulty with the above method is that the structure for calculating entry points is often already heavily overloaded. Furthermore, an additional bit is required for every additional length of flow that is hinted. For this reason, this technique often limits the number of unique flows that can be hinted. Other flows may use a marker at the end of the flow, incurring a full pipeline penalty.

SUMMARY

A method and an apparatus provides for improving the rate at which macroinstructions are transformed into corresponding microinstructions. In this apparatus, an additional encoding is added to a microcode storage device. The encoding indicates that the flow will end in a determined number of cycles. The number of cycles is determined by the number of canceled instructions, or bubbles, that are introduced if no prediction is used. For flows shorter than this minimum length, a hint in an entry point programmable logic array (PLA) may be used, for example.

Each access of microcode in the microcode storage device produces one or more microinstructions. All microinstructions obtained in a single access of the microcode storage device may be referred to as a line of microcode. A computer system may fetch N additional lines of microcode before being able to decode a line of fetched microinstructions and determine that the end of the flow has been reached. This is so for the following reason. The computer system may need to start the next flow before the first line of microcode in the current flow had been decoded, making it impossible to use information in the microcode itself to redirect the next flow in time to prevent unneeded microcode fetches from being initiated. For flows that are N+1 lines or longer, however, a method for hinting the flow length may involve adding an additional encoding N lines before the end of the flow. The additional encoding indicates the flow will end after N additional fetches. Since the delay from initiating a fetch to decoding the microcode is N cycles, a hint in the microcode N+1 cycles from the end can redirect the flow in time to prevent unneeded fetches from the current flow from being issued. The encoding allows the microcode instruction sequencer to perfectly predict the end of the flow, and to eliminate bubbles in the pipeline that would have otherwise occurred without the hint.

This method and apparatus has the advantage that flows of any length can be hinted. In addition, flows that do not originate from the entry point structure can also be hinted. Finally, fewer hint bits are needed in the entry point structure, but better prediction is obtained. In particular, the number of hint bits is reduced to no more than two for systems with a two cycle microcode storage device lookup delay, a substantial improvement over existing systems.

DESCRIPTION OF THE DRAWINGS

The detailed description will refer to the following drawings in which like numerals refer to like objects, and in which:

FIG. 2 illustrates an embodiment of the use of hint bits; and

DETAILED DESCRIPTION

In a computer system executing multiple architectures, instructions for a first architecture may be emulated using instructions from a second architecture. For example, a computer system may emulate the first architecture instructions using the second architecture instructions. In particular, a series of microinstructions may be used to emulate a macroinstruction. The series of microinstructions is referred to as a flow. Flows may be of varying lengths and may or may not have branches. Each flow is processed through a processing pipeline and then the next flow is fetched for processing, with potentially multiple flows in the pipeline at any time. Because a significant amount of time is required to look up, address, extract, and decode microinstructions, significant delays may occur between completion of one microinstruction flow and fetching and processing of another flow. For example, in an implementation, N clock cycles may be required to select an address, look up the address in the storage, extract the data, decode the data and re-steer the processor upon occurrence of a branch or end of the flow. During these N clock cycles, additional instructions are being fetched from storage and are entering the processing pipeline. In an embodiment N may equal two clock cycles.

A prior art technique to minimize the delay from end of flows is to affix a bit to the entrypoint address to indicate the length of the flow so that the length of the flow is determined along with the initial address look-up. This technique has the advantage of providing the flow length immediately so that in the very next cycle, the correct flow address can be accessed and the correct instruction can enter the pipeline. However, this technique has the drawback that the instruction look-up table that is used to determine the microinstruction flows based on a macroinstruction tends to be very large and overloaded. Adding the additional bits to encode the lengths of the flow adds to the load, and for some flows, encoding may be impractical. As a result, common practice is to restrict the number of lines that can be hinted, for example, by only hinting flows of length one to five. Only a restricted number of flows may be encoded using this technique. Furthermore, this technique cannot be used with any flows that have branches.

Figure 1:
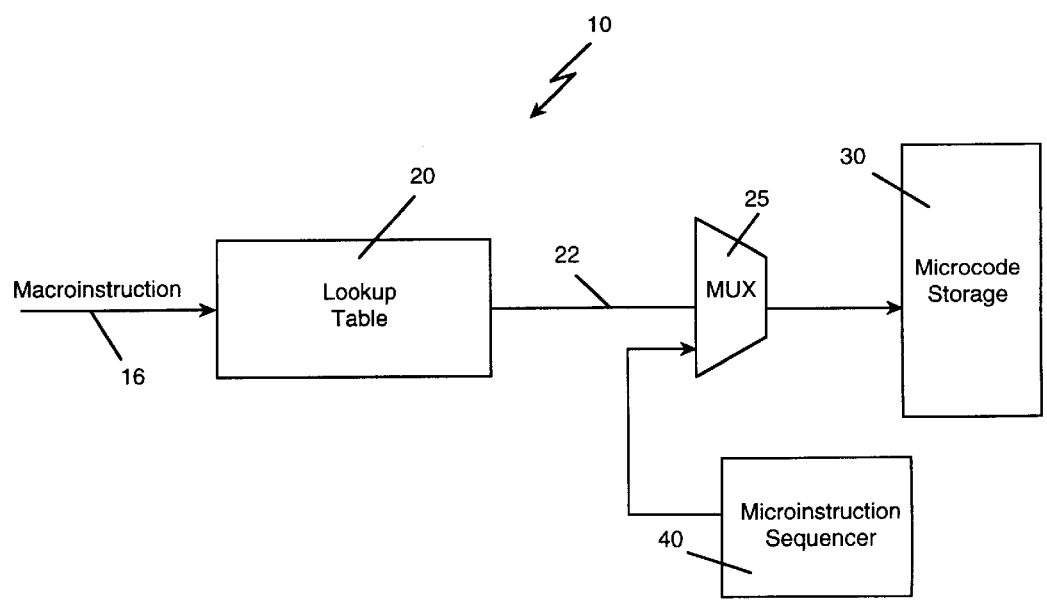
FIG. 1 is a block diagram of a computer system implementing multiple architectures.

FIG. 1 is a block diagram of portions of a computer system that implements multiple architectures. In FIG. 1, a computer system 10 uses a look-up table 20, or entry point structure, to translate macroinstructions 16 into a first microinstruction address 22. A microinstruction sequencer 40 provides a sequence of microinstructions, based on the microinstruction address 22, to be extracted from a microcode storage device 30. The sequence of microinstruction addresses is provided to the microcode storage device 30 using a multiplexer 25. In an embodiment, the microcode storage device may be a read-only-memory (ROM).

The microinstructions required to complete the microinstruction flow based on the output of the microinstruction sequencer 40 comprise a microinstruction flow that may be of any length and may include branches, conditional or otherwise. For example, a microinstruction flow may include one microinstruction or any number of microinstructions. The microinstruction flow may include one or more branches. Branches may redirect the microinstruction sequencer 40 to new flows that may include one or more additional branches.

FIG. 2 illustrates a microinstruction flow 60 of length N. In FIG. 2, a series of microcode lines $61_{1-61_N}$ are illustrated. Each line may include one or more microinstructions $62_i$. Because two clock cycles are required to lookup the next microinstruction flow in an example, the microcode line $61_{N-2}$ includes an encoding bit 65 that signals an end of the flow $61_N$ two cycles later. As noted above, the selection of N as two cycles is dependent on the implementation, and other cycle delays may be accommodated.

The following table shows examples of flows whose length may be hinted. In some cases the hint may be provided at the entry point structure and in other cases, the hint may be provided by the microcode encoding.

| FLOW | LINES |
| --- | --- |
| Entry Flow A: | microinstruction entry (end of flow) |
| Entry Flow B: | microinstruction entry |
| | microinstruction entry (end of flow) |
| Entry Flow C: | microinstruction entry (microcode hint) |
| | microinstruction entry |
| | microinstruction entry (end of flow) |
| Entry Flow D: | microinstruction entry |
| | microinstruction entry (microcode hint) |
| | microinstruction entry |
| | microinstruction entry (end of flow) |
| Entry Flow E: | microinstruction entry |
| | microinstruction entry |
| | microinstruction entry |
| | microinstruction entry |
| | . |
| | . |
| | . |
| | microinstruction entry (microcode hint) |
| | microinstruction entry |
| | microinstruction entry (end of flow) |
| Entry Flow F: | microinstruction entry |
| | branch to flow G |
| Internal Flow G: | microinstruction entry (microcode hint) |
| | microinstruction entry |
| | microinstruction entry (end of flow) |
| Exception Flow H: | microinstruction entry |
| | microinstruction entry |
| | microinstruction entry |
| | microinstruction entry |
| | microinstruction entry |
| | microinstruction entry (microcode hint) |
| | microinstruction entry |
| | microinstruction entry (end of flow) |
| Entry Flow I: | microinstruction entry |
| | microinstruction entry |
| | microinstruction entry |
| | conditional branch to J |
| | microinstruction entry |
| | microinstruction entry (microcode hint) |
| | microinstruction entry |
| | microinstruction entry (end of flow) |
| Internal Flow J: | microinstruction entry |
| | microinstruction entry |
| | microinstruction entry |
| | microinstruction entry |
| | microinstruction entry (microcode hint) |
| | microinstruction entry |
| | microinstruction entry (end of flow) |
| Entry Flow K: | microinstruction entry |
| | branch L |
| Internal Flow L: | microinstruction entry |
| | microinstruction entry (end of flow) |

Entry Flows A, B, C, and D are flows entered from the entrypoint PLA that have lengths 1, 2, 3, and 4, respectively. Entry Flow E is a flow entered from the entrypoint PLA that has length N. Entry Flow F is a flow entered from the entrypoint PLA with an unconditional branch to internal flow G. Internal Flow G is a flow entered via a branch from another flow, having length 3.

Exception Flow H is a flow entered from an exception entrypoint PLA that has length, for example, 8. Entry Flow I is a flow entered from the entrypoint PLA that has a conditional branch to flow J. If the branch is not taken, the flow length is 8. If the branch is taken, flow J must be examined to determine the actual length of the flow. Internal Flow J is a flow entered via a branch from another flow, having length, for example 8. Entry Flow K is a flow entered from the entrypoint PLA with an unconditional branch to internal flow L. Internal Flow L is a flow entered via a branch from another flow, having length 2.

In the examples of Flow A through L provided above, all ends of flow will incur a two cycle penalty if no hints are provided regarding the length of the flows. If an entry point hint is used (i.e., hints based on the instruction decoding process) for Flows A–E, and if the entry point PLA were to attempt to hint all of these flows, the entry point structure would need hints that cover a wide range of flow lengths. This may be difficult to implement. However, if hinted, the flows will incur no penalties.

Flows F, I and K may not be hinted using the entry point structure because the entry point structure may not account for branches that may or may not be taken. This is because branches may change flow lengths, and because hinting across branches is difficult to implement. Without hinting regarding flow lengths, each of the Flows F, I and K will incur a two cycle penalty.

The internal Flows G, J and L are not part of the external entry point logic and may not be hinted using the entry point structure. The Flows G, J and L will incur a two cycle penalty.

The exception Flow H is usually not contained in an entry point logic. Therefore, exception Flow H would require a separate hinting structure, which may not be considered worthwhile. Thus exception Flow H would normally incur a two cycle penalty.

Using the microcode hinting method described above, the Flows A–B can be hinted using entry point logic with no delays induced. The Flows C–I are hinted in microcode with no delays induced. Note that the internal flows (i.e., G and J) can be hinted as can Flows such as I and J with conditional branches that have two (or more) flow endings. All that is required is that there be at least three non-branches ending a flow.

Finally, Flow K may not be fully hinted using the microcode method. In one embodiment, no hint is provided unless at least three sequential lines of microinstruction (counting the end of flow) without a branch exists. In another embodiment, a different encoding can be provided that the end of flow is one cycle away. This reduces the penalty from two cycles to one cycle.

Figure 3:
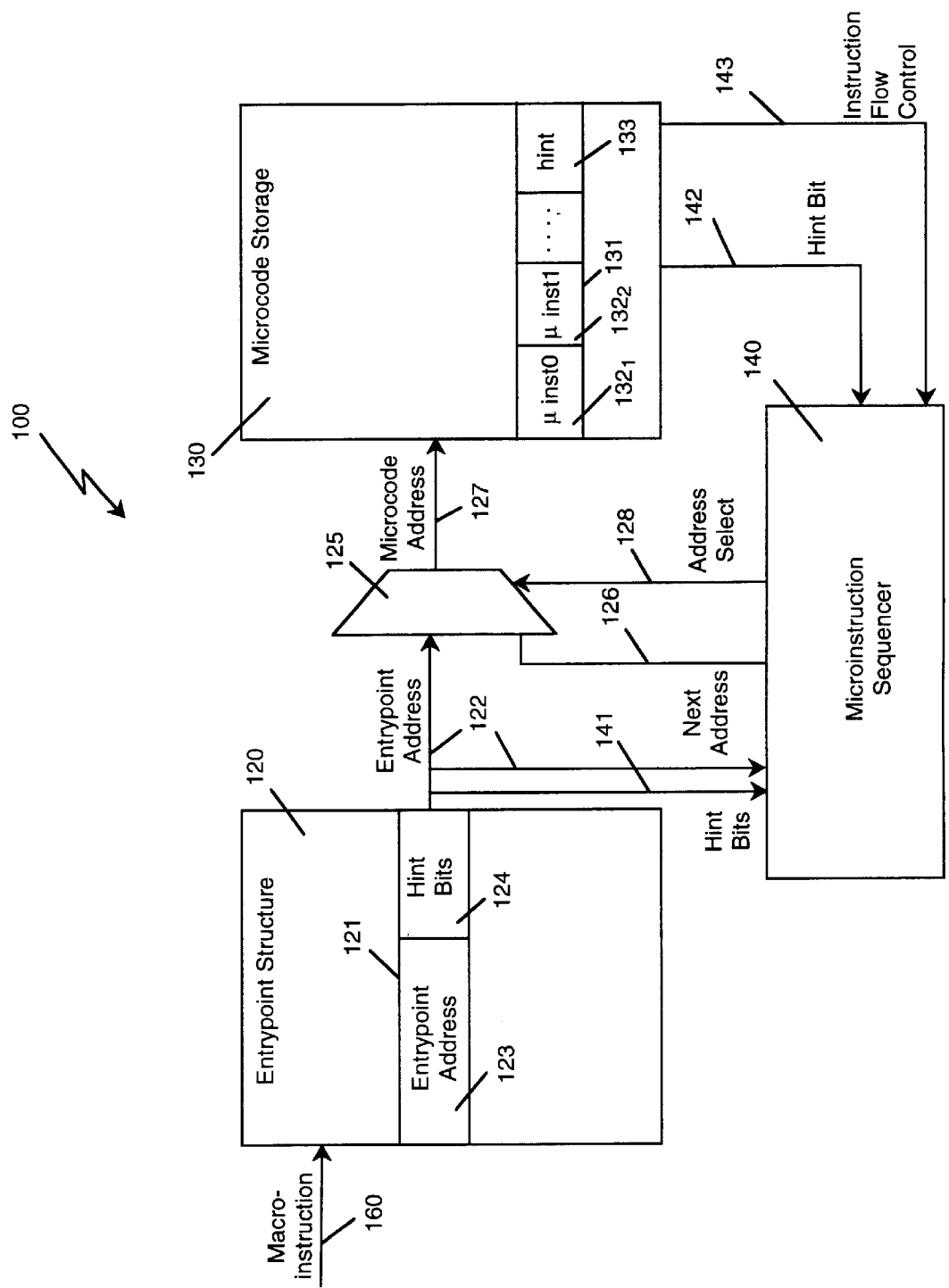
FIG. 3 illustrates an apparatus for encoding hint bits.

FIG. 3 is a block diagram of an apparatus used to encode flow lengths. The components shown in FIG. 3 are similar to those shown in FIG. 1. In FIG. 3, an apparatus 100 uses an entry point structure 120 to translate macroinstructions 160 into an entrypoint address 122. A microinstruction sequencer 140 provides a sequence of microinstructions, using a next address signal 126, a hint bit 133 from the microcode storage 130, and flow information 143 such as detection of branches and end-of-flow from microcode storage 130.

The entrypoint structure 120 contains an entry 121 having an entrypoint address 123 for initiating the microcode sequencer 140 for a new flow that emulates a macroinstruction, and 0 or more hint bits 124. In an embodiment, the hint bits 124 are used for flows of length 1–2. Other embodiments may require fewer or more hints. The detail shown is a sample entry, of which there are many.

The microcode storage 130 provides microcode hint bits 142 and flow information 143 to the microinstruction sequencer 140. The microinstruction sequencer 140 receives hint bits 141 from the entry point structure 120 for flows of a specific length. The microcode storage 130 includes one or more microcode instructions $132_i$ per line 131, and one hint bit 133, per line. The detail shown is a sample entry, of which there are many.

After selecting the initial flow address 122, certain bits from the instruction are used to select the correct microinstruction entrypoint (microcode) address 127. The microinstruction sequencer 140 selects the microcode address 127 through the multiplexer 125. The microcode address 127 is used to look up the correct microinstruction data, such as the microinstruction data 131.

The entrypoint address 122 is sent to the address select multiplexer 125 and to the microinstruction sequencer 140. Hint bits 141 from the entrypoint structure 120 are sent to the microinstruction sequencer 140 to provide early indication of when the flow will end. A hint of "one" means that the flow is only one line long, and indicates that the microinstruction sequencer 140 should send the next entry-point address 122 to the microcode storage 130 in the next clock cycle. A hint of "two" means that the flow is two lines long, and the microinstruction sequencer 140 should delay one clock cycle before sending the next entrypoint address 122 to the microcode storage 130.

The microinstruction sequencer 140 uses these hints, along with the instruction flow control 143 and the hint bit 142 to determine where the next address comes from, address 126 and address select 128. Once microinstructions start coming out of the microcode storage 130 for a given flow (N-cycle delay), the address select 128 can be used by the microinstruction sequencer 140 to select a new entry-point address 122, or to continue with the current flow by selecting next address 126. Because there are multiple cycles between the time a microcode address 127 is available to be sent to the microcode storage 130 and the time the data is retrieved, additional accesses to the microcode storage 130 may have already occurred. The hint bit 142 is encoded early enough in the flow such that the hint 133 in microcode storage 130 can be used to detect the imminent end of the flow and select the next entrypoint address 122 in time to avoid sequencing past the end of the flow. In an embodiment, this number was "N–2", i.e., if the flow was length N, the N–2 line would be hinted. The microinstruction sequencer 140 could use the hint to allow the next entrypoint address 122 to enter the microcode storage 130. A hint on the N–2 line means that fetches for the N–1 line and $N^{th}$ line have already been issued. The hint prevents the N+1 line (i.e., one line after the end of the N-length flow) from being fetched, and directs the microinstruction sequencer 140 to select the next entrypoint address 122 from the entrypoint structure 120.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

What is claimed is:

1. A method to reduce a penalty in microcode lookup in a microcoded machine, comprising:

providing a macroinstruction for emulation;

determining a microinstruction flow corresponding to the macroinstruction;

determining a length of the microinstruction flow;

if the length of the microinstruction flow is N lines or less, wherein N is greater than one, providing a first hint bit at a first microinstruction; and if the microinstruction flow length is greater than N, providing a second hint bit at a second microinstruction different from the first microinstruction, wherein the second microinstruction is not a last microinstruction in the microinstruction flow.

2. The method of claim 1, wherein the first hint bit is provided with an entrypoint address and the second hint bit is provided in the microinstruction flow.

3. The method of claim 2 further comprising storing the microinstruction flow and the second hint bit in a microcode storage device.

4. The method of claim 3, further comprising for a microinstruction flow of P clock cycle processing time where P is greater than N, providing the second hint bit at P–N microinstruction.

5. The method of claim 4, providing additional non-optimal hint bits.

6. The method of claim 1, wherein the first hint bit indicates a microinstruction flow length of N.

7. The method of claim 1, wherein the first hint bit indicates a microinstruction flow length of N–J, where J is an integer of value less than N.

8. The method of claim 1, wherein the microcoded machine implements multiple architectures, and wherein instructions from a first instruction set architecture are used to emulate instructions from a second instruction set architecture.

9. The method of claim 1, further comprising using multiple first hint bits, wherein each of the multiple first hint bits indicates a different flow length.

10. The method of claim 1, wherein second hint bits are provided for one or more of external flows, internal flows, branches and exceptions.

11. An apparatus for reducing a penalty in microcode lookup, comprising:

an entrypoint structure that provides an entrypoint address and a first hint bit at a first microinstruction if the length of the microinstruction flow is N lines or less, wherein N is greater than one;

a microcode storage device that receives a microcode address and provides a second hint bit at a second microinstruction different from the first microinstruction if the length of the microinstruction flow is greater than N, wherein the second microinstruction is not a last microinstruction in the microinstruction flow; and a microcode sequencer that receives the entrypoint address and the first and the second hint bits, wherein the first and the second hint bits inform the microcode sequencer as to a length of a current microinstruction flow.

12. The apparatus of claim 10, wherein the first hint bit is provided for a microinstruction flow length of N clock cycles or less and the second hint bit is provided for a microinstruction flow length of greater than N clock cycles.

13. The apparatus of claim 12, wherein for a microinstruction flow of P clock cycle processing time, where P is greater than N, the second hint bit is provided at a P–N microinstruction.

14. The apparatus of claim 12, wherein additional non-optimal hint bits are provided.

15. The apparatus of claim 11, wherein the first hint bit indicates a microinstruction of flow length N.

16. The apparatus of claim 11, wherein the first hint bit indicate a microinstruction flow length of N–J, where J is an integer less than N.

17. The apparatus of claim 11, wherein the apparatus is implemented in a microcoded machine implementing multiple architectures, and wherein instructions from a first instruction set architecture are emulated using instructions from a second instruction set architecture.

18. The apparatus of claim 11, wherein the entry point structure implements multiple first hint bits, wherein each of the multiple first hint bits indicates a different flow length.

19. The apparatus of claim 11, wherein the microcode storage device stores second hint bits for one or more of external flows, internal flows, branches, and exceptions.

* * * * *